UNITED STATES PATENT OFFICE.

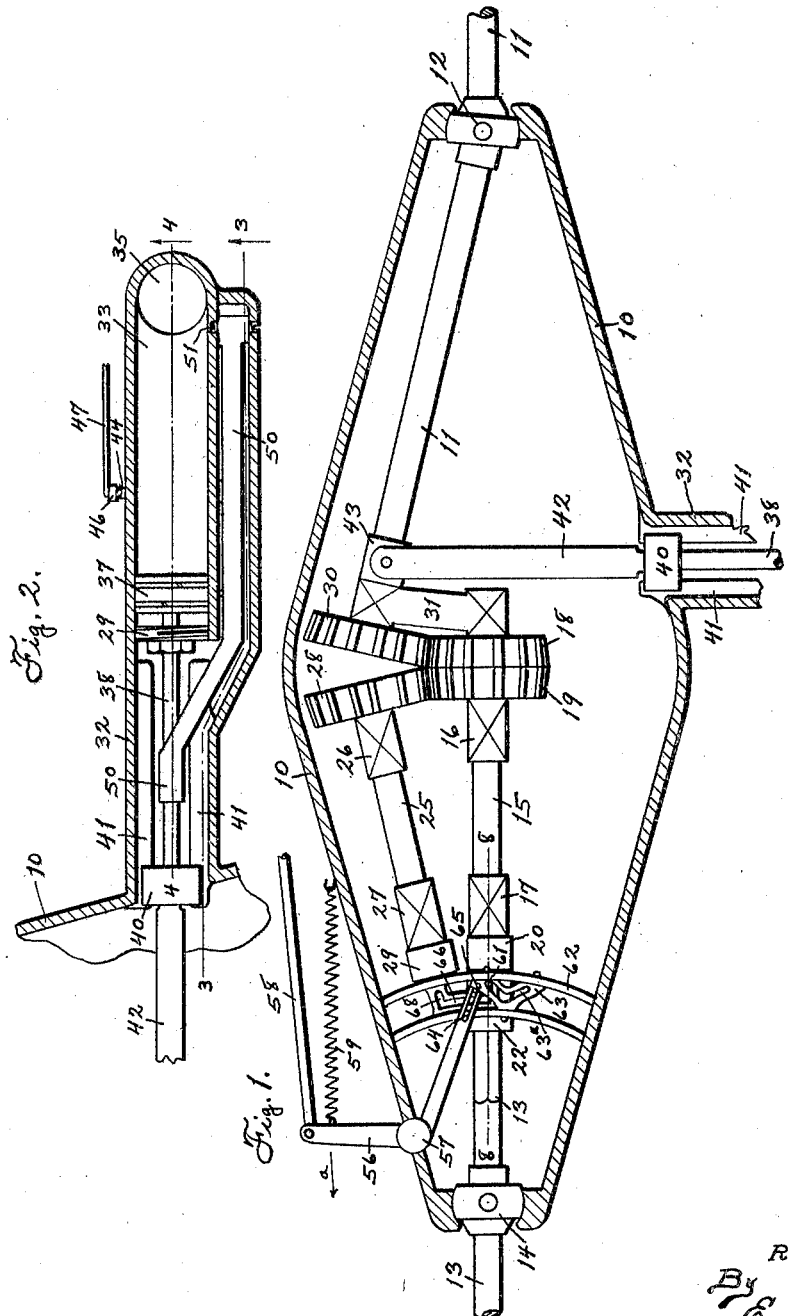

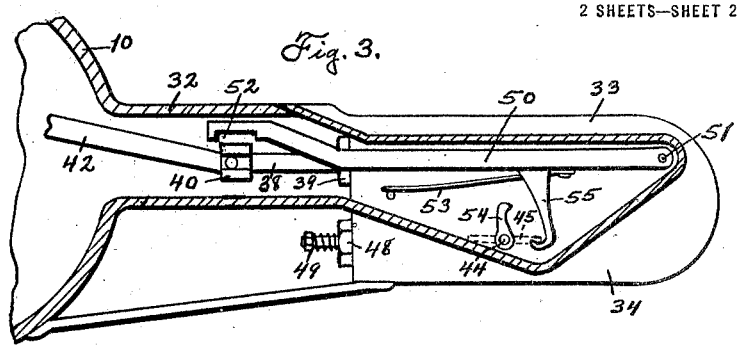
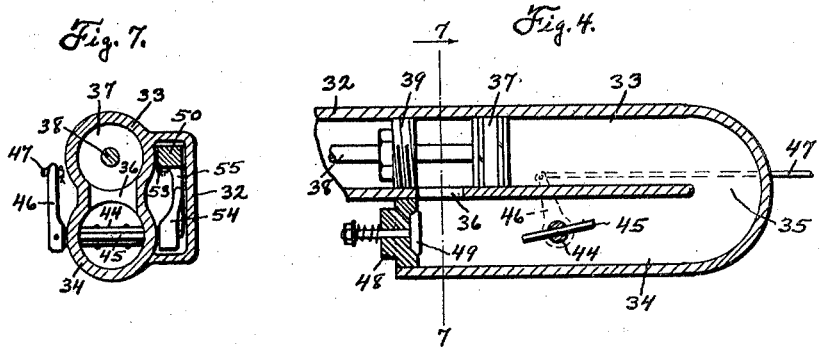
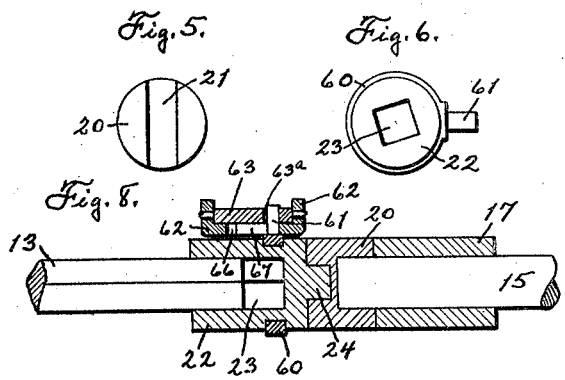

ROBERT B. PERKINS, OF OKLAHOMA, OKLAHOMA.

TRANSMISSION MECHANISM.

1,399,573.  Specification of Letters Patent.  Patented Dec. 6, 1921.

Application filed December 17, 1920. Serial No. 431,451.

*To all whom it may concern:*

Be it known that I, ROBERT B. PERKINS, a citizen of the United States of America, and resident of Oklahoma city, Oklahoma county, Oklahoma, have invented a new and useful Transmission Mechanism, of which the following is a specification.

The object of this invention is to provide an improved transmission mechanism for motor vehicles by which a great variety of speeds forward and reverse may be secured without shifting of gears.

A further object of this invention is to provide a transmission mechanism by means of which gradual changes of speed may be secured, independently of alteration of the fuel supply, without loss of power attendant upon shifting of gears or manipulation of clutches.

A further object of this invention is to provide improved means, in a transmission mechanism, for changing from forward to reverse direction of travel.

A further object of this invention is to provide an improved system of planetary gearing in which the drive shaft is free to rotate about the transmission shaft and retarding influence is applied, under control of the operator, to check such rotary travel to greater or less extent to effect rotary motion of the transmission shaft.

A further object of this invention is to provide an improved construction for a dash-pot retarding device.

With these and other objects in view, my invention consists in the construction, arrangement and combination of elements hereinafter set forth, pointed out in my claims and illustrated by the accompanying drawings, in which—

Figure 1 is a longitudinal section illustrating the principal members of my improved mechanism. Fig. 2 is a longitudinal section of the dash-pot retarding devices. Fig. 3 is a longitudinal section taken on the line 3—3 of Fig. 2. Fig. 4 is a longitudinal section taken substantially on the line 4—4 of Fig. 2. Fig. 5 is a rear view of the cap of the reverse shaft and Fig. 6 is a rear view of the cap of the transmission shaft. Fig. 7 is a cross-section on the line 7—7 of Fig. 4. Fig. 8 is a longitudinal section on an enlarged scale on the line 8—8 of Fig. 1.

In the construction of the mechanism as shown the numeral 10 designates a case or housing which may be of any suitable size, shape and configuration to contain the desired elements and permit the movements indicated therefor. A drive shaft 11 has suitable connections to a source of power such as a prime mover (not shown) and enters the forward end of the housing 10, being provided between its ends with a universal joint 12, shown conventionally, having a bearing and support in the forward end portion of said housing. A transmission shaft 13 is provided and is arranged axially of the housing and extends through the rear end portion thereof, said shaft being equipped between its ends with a universal joint 14 of suitable form having a bearing and support in the rear end of said housing. The transmission shaft 13 has suitable connections at its rear end to devices to be driven (not shown) such as the rear wheels of a vehicle through a differential, rear axle or other suitable devices.

A shaft 15, hereinafter referred to as the forward shaft, since it is employed in forward movement of the mechanism and to produce forward movement of the vehicle on which the mechanism is used, is located in and centrally of the housing 10 and is journaled in bearings 16, 17 suitably carried, said shaft being in axial alinement with and in front of the transmission shaft 13. To the forward end of the forward shaft 15, and located substantially at the longitudinal and transverse center of the housing 10, is fixed a double gear, having faces indicated by the numerals 18, 19, each of said gear faces being slightly beveled. The gear faces 18, 19 may be regarded as separate gears, as their functions are entirely independent, but they are preferably formed together for convenience and strength. Fixed to the rear end of the forward shaft 15 is a cap 20 formed on its rear face with a diametrical groove 21 (see Fig. 5). The forward end portion of the transmission shaft 13, within the housing 10, is formed angular in cross-section and a cap 22 is formed with an angular bore 23 (Fig. 6) fitting said angular portion, so that said cap is slidably mounted on said shaft and yet adapted for rotation therewith. The cap 22 is formed on its forward face with a diametrical tongue 24 adapted to enter the groove 21 of the cap 20, thus providing an operative yet detachable connection between the shafts 15 and 13, engagement and disengagement thereof being effected by sliding the cap 22 on the angular portion of the shaft 13.

A reverse shaft 25 is arranged at one side of and at a slight angle relative to the forward shaft 15 and is journaled for rotation in bearings 26, 27 suitably carried within the housing. To the forward end of the reverse shaft 25 is fixed a gear 28 meshing with the gear 19 of the forward shaft; and to the rear end of said reverse shaft is fixed a cap 29 similar to the cap 20 and having in its rear face a groove adapted to receive, at times, the tongue 24 of the cap 22 on the transmission shaft, such engagement being effected by releasing the cap 22 from the cap 20 and swinging the forward portion of the transmission shaft 13 laterally, articulating on the universal joint 14, until such forward portion alines with the reverse shaft 25. This operation will be hereinafter more fully explained, together with the means for accomplishing it.

Fixed to the rear end portion of the drive shaft 11 is a gear 30 meshing with the gear 18 of the forward shaft, the rear portion of said drive shaft, between the universal joint 12 and the gear 30, is inclined or arranged at an angle to the axis of the housing and of the shaft 15, to permit meshing of the gears 18 and 30. The rear portion of the drive shaft 11 is pivotally connected to the front end portion of the forward shaft 15 by means of a link 31 or coupling, which is formed at its ends with bearing portions journaled on said shafts. It is the function of the link 31 or coupling to hold the shaft 11 so that the gear 30 remains at all times in mesh with and is adapted at times for travel around the gear 18 in an orbit having a radius defined by the length of said link or coupling, the rear portion of said shaft 11, in such orbital travel, articulating on the universal joint 12.

Considering only the elements thus far described, and assuming that the cap 22 of the transmission shaft is in its normal position of engagement with the cap 20 of the forward shaft, rotation of the drive shaft 11 through its connection to the prime mover will result only in orbital travel of the gear 30, and rear end portion of said drive shaft, around the gear 18, following the course of least resistance, and the forward shaft 15, transmission shaft 13 and reverse shaft 25 will not be operated. In other words, operation of the prime mover will not be communicated to the driving elements of the vehicle, which will remain at rest, a condition analogous to that of the common transmission mechanisms when the clutch devices thereof are disconnected.

In order to secure operation of the forward or reverse shafts, and through either of them of the transmission shaft 13 and traction wheels of the vehicle, it is necessary to apply a retarding influence to the gear 30 and rear end of the drive shaft, and to the extent that such retarding influence is applied will rotary motion of the drive shaft be converted into rotary motion of the follower devices, rather than being consumed in orbital travel around the gear 18. When such retarding influence is applied, in any suitable manner and to any desired extent, rotary motion of the drive shaft, when the cap 22 of the transmission shaft is in normal condition of engagement with the cap 20 of the forward shaft, will be transmitted through the gear 18 to said forward shaft 15 and, through interengagement of the caps 22 and 20, to the transmission shaft 13 in such manner as to cause forward movement of the vehicle; the reverse shaft 25 idling in its bearings through engagement of the gear 28 thereof with the gear 19 of the forward shaft. When the cap 22 of the transmission shaft is put into engagement with the cap 29 of the reverse shaft 25, through the means provided for that purpose, rotary motion of the drive shaft 11 will be transmitted, through the effect and to the extent of the retarding influence, through the gear 30 to the gear 18 to the forward shaft 15, which will idle in its bearings and its motion will be transmitted through the gears 19 and 28 to the reverse shaft 25 and, through the interengagement of the caps 29 and 22, to the transmission shaft 13 in such manner as to cause reverse movement of the vehicle.

Any suitable retarding means may be employed to so limit the orbital travel of the gear 30 and rear end of the drive shaft as to produce any speed of the follower devices between absolute rest and a speed equal to that of said drive shaft. I have shown the housing 10 formed with a lateral extension 32 of relatively small diameter and located near the longitudinal center of said housing. Within and at the outer end portion of the extension 32 are formed two cylinders 33, 34 arranged side by side communicating at their extreme outer ends through a port 35 and at their inner ends through a port 36. A piston 37 is arranged for travel in the cylinder 33, between the ports 35, 36, and has a piston rod 38 passing through a gland or packing member 39 at the inner end of said cylinder. A cross-head 40 is carried by the inner end of the piston rod 38 and is arranged for sliding movement in engagement with cross-head guides 41 formed on the inner walls of the extension 32. A connecting rod 42 is pivotally connected at one end to the cross-head 40 and at its other end is pivotally connected to a collar 43 loosely embracing the rear end of the drive shaft 11. It is apparent that orbital travel of the gear 30 and rear end of the drive shaft will result in reciprocal movement of the piston 37 in the cylinder 33, and that any resistance that is offered to such reciprocal movement of the piston will have a retarding influence on such orbital travel and result in rotary movement of the follower devices. The cylinders 33, 34 are designed to be filled to the desired extent with a suitable fluid such as lubricating oil, which fluid may at times act to limit or prevent movement of the piston in the cylinder 33. A valve stem or rod 44 is mounted transversely through the cylinder 34 and has fixed thereto a valve 45 adapted to be so arranged as to entirely close and cut off said cylinder and prevent flow of fluid therethrough, and also adapted to be arranged, as shown in Fig. 4, so as to offer little or no resistance to such flow. To the outer end of the valve rod 44 is secured a lever 46 to which is secured pivotally one end of a controlling rod 47 adapted for manipulation to adjust the valve 45 in the cylinder 34 so as to provide a selected degree of resistance to flow of fluid in such cylinder, and consequently to reciprocal travel of the piston 37 in the cylinder 33, said cylinders at all times being in communication by means of the ports 35, 36, through which the fluid may flow freely in either direction when there is no other obstacle to hinder such flow. The controlling rod 47 is extended to a position adjacent the driver's seat and is supplied with suitable connections or devices (not shown) by which it may be manipulated to adjust the valve 45 and thus supply the desired degree of resistance and retarding influence to produce any speed of the follower devices commensurate with the power of the prime mover.

The cylinder 34 may be formed with an opening at one end normally closable by a plug 48; and said plug may be formed with an opening giving access to the interior of the cylinder and normally closed by a spring-pressed inlet valve 49, by means of which oil or other fluid may be introduced to the cylinders.

It is desirable to provide means for locking the retarding devices, in order to relieve strain, when the mechanism is in position to attain the highest speed of the follower devices; that is to say, when the valve 45 is entirely closed and such resistance is offered to the piston 37 as to prevent any reciprocal movement thereof. For this purpose I have provided a locking lever 50 in the extension 32 and located at one side of the cylinders 33, 34. This lever 50 is pivoted at its outer end on a pin or stud 51 and is formed at its inner and free end with a notch 52 adapted to engage and prevent movement of the cross-head 40, said lever being offset between its ends to bring its inner notched end into alinement with and above the piston rod beyond the inner end of the cylinder 33. A spring 53 normally acts to hold the locking lever 50 in inoperative position, with the notch 52 out of engagement with the cross-head. Any suitable connections may be employed between the valve-operating devices and the locking lever 50 to automatically cause said lever to be moved to locking position, against the influence of the spring 53, at the moment the valve 45 reaches its position of complete closing of the cylinder 34. In this instance I have shown a hooked lug or arm 54 secured to the valve rod 44 within the extension 32 and adapted to engage a hooked lug or arm 55 fixed to and depending from the locking lever 50. Just as the valve 45 reaches its full closing position the lug 54 engages within the hook of the lug 55, causing a depression of the locking lever 50 and engagement of the notch 52 thereof with the cross-head, thus providing a positive means of preventing movement of the piston and also of preventing orbital travel of the inner end of drive shaft. Thus all of the power of the drive shaft is transmitted to the follower devices. As soon as the valve 45 is opened to a slight degree the locking lever is released and dependence for retarding influence is placed upon the resistance offered by fluid in the cylinders to travel of the piston 37, as determined by the selected position of the valve.

To accomplish the shifting of the forward end of transmission shaft 13 for engagement of the cap 22 thereof with the cap 29 of the reverse shaft, a bell-crank lever 56 is fulcrumed on the housing 10 at the point 57, one arm of said lever extending within and the other arm outside of said housing. A controlling rod 58 is pivoted at one end to the outer arm of the bell-crank lever 56 and said rod is extended to a point adjacent the driver's seat and is provided with suitable connections (not shown) such as a foot lever for operating it in one direction. A retractile coil spring 59 is fixed at one end to the bell-crank lever 56 and at its other end to the housing 10 and is adapted to hold said bell-crank lever and the members connected therewith in their normal position as shown, and to return them to such position after actuating influence applied to the lever through the rod 58 and its connections is released.

The sliding cap 22 of the transmission shaft is formed with a circumferential groove in which is mounted loosely a shifting ring 60 having a laterally extending stud 61. An arcuate guide member 62 is mounted transversely of and within the housing 10 just above the ends of the shafts 13, 15 and 25. The arcuate guide member 62 is sloted laterally and a shifting member 63 is mounted for sliding movement in said slots, transversely of the housing. The shifting member 63 is formed with an angular slot 63ᵃ receiving the stud 61 of the shifting collar. The inner end portion of the bell-crank lever 56 extends partially across the arcuate guide member 62 to a point above the sliding shifting member 63, and is formed with a longitudinal slot 64 receiving loosely a pin or stud 65 carried by said shifting member. The arcuate guide member 62 also is formed in its central portion with a longitudinal slot 66 in which the stud 61 is adapted to travel, and said slot terminates at its ends in forwardly extending branches 67, 68, directed respectively toward and arranged axially of the shafts 15 and 25.

When the bell-crank lever 56 is oscillated in the direction of the arrow $a$ in Fig. 1, through operation of the controlling rod 58 and against the influence of the spring 59, the inner end of said lever acts to slide the shifting member 63 laterally in the arcuate guide 62, toward the rear end of the reverse shaft 25. The angular slot 63ᵃ of the shifting member is so shaped and arranged as to produce, upon the first application of such pressure, a rearward movement of the stud 61 in the lateral branch slot 67 of the guide member, thus moving the cap 22 of the transmission shaft out of engagement with the cap 20 of the forward shaft. When the stud 61 has reached the rear end of the branch slot 67, further oscillation of the lever 56 is applied, through the shifting member 63 and the slot thereof, to cause a lateral or sidewise movement of the stud 61 in the main part of the slot 66 of the guide member, thus carrying the cap 22 and end of the transmision shaft laterally to a position of alinement with the reverse shaft 25; and when such position is reached, further oscillation of said lever, through the influence of the shifting member 63 and because of the shape of its angular slot 63ᵃ, results in a forward movement of the stud 61 in the branch slot 68, this causing a forward movement of the cap 22 to engagement with the slotted cap 29 of the reverse lever. So long as reverse movement of the vehicle is desired this engagement is maintained by continuation of pressure upon the controlling member secured to the rod 58, and as soon as such pressure is released the spring 59 acts to return the parts to their normal position for forward movement of the vehicle, the shifting member 63 producing an opposite movement of the stud 61 in the guide device to that above described.

In practical use, the vehicle and motor being at rest, the valve 45 is placed in completely open position by the controlling means provided for it, so that no resistance, practically, is offered to the travel of piston 37 and no retarding influence to the orbital travel of gear 30, hence no motion is transmitted to the follower devices; and then the motor is started and the valve 45 is gradually opened to attain the desired speed of the follower devices through the means previously described. The driver can start his car and cause it to travel from a dead stop, with gradually increasing speed to the highest of which it is capable, by simply moving a controlling lever similar to the ordinary throttle lever, such movement being so gradual as to cause the car to pick up speed without "killing" the engine. When a reverse movement is desired the bell-crank lever 56 is oscillated through the rod 58 as previously described.

At no time is it necessary to release a clutch or shift a gear in order to change from one speed to another, and the number of degrees of speed obtainable are practically unlimited.

If desired the arrangement of the driving and forward shafts may be reversed or transposed, so that the driving shaft 11 is journaled in fixed bearings and the forward shaft 15 travels in an orbit around it; and I do not desire to be understood as limiting myself to the precise construction and arrangement herein shown and described. In the accompanying claims, it is to be understood that the words "drive" and "follower" or "forward," as applied to the various shafts, are terms of identification and not of limitation.

I claim as my invention—

1. A transmission mechanism, comprising a follower shaft, a gear fixed to said shaft, a drive shaft having a universal joint, a gear fixed to the drive shaft and meshing with and adapted for orbital travel around the first gear, and means for applying a retarding influence to the orbital travel of said second-named gear.

2. A transmission mechanism, comprising a follower shaft, a gear fixed to said shaft, a drive shaft having a universal joint, a gear fixed to the drive shaft and meshing with and adapted for orbital travel around the first gear, and means for applying a selected degree of retarding influence to such orbital travel.

3. A transmission mechanism, comprising a follower shaft, a gear fixed thereto, a drive shaft having a universal joint, a gear fixed to the drive shaft in mesh with and adapted for orbital travel around the first gear, and valve-controlled dash-pot devices for applying a selected degree of retarding influence to such orbital travel.

4. A transmission mechanism, comprising a pair of shafts geared together, a transmission shaft equipped with a universal joint and adapted to be alined with and operatively connected selectively to the first shafts, a second gear fixed to one of the pair of shafts, a drive shaft equipped with a universal joint, a gear fixed to the drive shaft in mesh with and adapted for orbital travel around the last-named gear, and means for applying retarding influence to such orbital travel.

5. A transmission mechanism, comprising a pair of shafts arranged in juxtaposition, gear connections between said shafts, a transmission shaft equipped with a universal joint and adapted to be alined with and operatively connected selectively to the first shafts, a second gear fixed to one of the pair of shafts, a drive shaft equipped with a universal joint, a gear fixed to the drive shaft in mesh with and adapted for orbital travel around the last-named gear, means for applying retarding influence to such orbital travel, a shifting member adapted for travel adjacent the pair of shafts, means connected with said shifting member for effecting engagement and disengagement of the operative connections between the transmission shaft and pair of shafts, and manually controlled means for operating said shifting member.

6. In a transmission mechanism, a housing, a follower shaft journaled therein, a gear on said shaft, a drive shaft equipped with a universal joint, a gear on said drive shaft in mesh with and adapted for orbital travel around the first-named gear, a coupling pivotally connecting the drive shaft to the follower shaft, said housing being formed with a lateral extension having a cylindrical chamber, a piston mounted for travel in said cylindrical chamber and having pivotal connections to the oscillating end of said drive shaft, said cylindrical chamber containing a fluid adapted to pass from one side to another of said piston at times and to offer resistance to travel thereof, and means for controlling flow of said fluid.

7. In a transmission mechanism, a driving member mounted for orbital travel, a cylindrical chamber, a piston arranged for travel in said chamber, pivotal connections between said piston and said driving member, a second chamber adjacent the cylindrical chamber, ports affording communication between said chambers at opposite ends of the piston travel, and valve devices for controlling flow of fluid through said second chamber.

8. In a transmission mechanism, a driving member, mounted for rotation and for orbital travel, a cylindrical chamber, a piston arranged for travel in said chamber, pivotal connections between said piston and said driving member, a second chamber adjacent the cylindrical chamber, ports affording communication between the chambers at opposite ends of the piston travel, valve devices for controlling flow of fluid in said second chamber, and means for automatically locking said piston against travel when said valve is in closed position.

Signed this 29th day of November, 1920.

ROBERT B. PERKINS.